United States Patent [19]

Thompson

[11] 3,806,811

[45] Apr. 23, 1974

[54] MULTIPLE CARRIER PHASE MODULATED SIGNAL GENERATING APPARATUS

[75] Inventor: Wallace T. Thompson, East Amherst, N.Y.

[73] Assignee: GTE Sylvania Incorporated, Stamford, Conn.

[22] Filed: Jan. 20, 1972

[21] Appl. No.: 219,363

[52] U.S. Cl..................... 325/146, 178/67, 325/363, 328/16, 332/16

[51] Int. Cl............................................... H04b 1/04

[58] Field of Search............... 178/67, 66; 324/77 B; 325/45, 47, 141–148, 126, 133, 134, 163, 363, 153, 310, 320, 58, 67; 328/16, 17; 331/76, 78, 107 R, 132, 172, 173; 332/14, 16, 23

[56] References Cited

UNITED STATES PATENTS

| | | | |
|---|---|---|---|
| 3,354,410 | 11/1967 | Beuscher | 332/14 |
| 3,576,499 | 4/1971 | Axford et al. | 328/16 |
| 3,158,752 | 11/1964 | Strief | 328/16 |
| 3,648,177 | 3/1972 | Himmel | 325/141 |

*Primary Examiner*—Albert J. Mayer
*Attorney, Agent, or Firm*—David M. Keay; Elmer J. Nealon; Norman J. O'Malley

[57] ABSTRACT

Signal generator for use in testing FM communication receivers including a triggered free-running multivibrator which may be synchronized to operate at a frequency equal to the spacing between adjacent channels of the FM receiver and an audio oscillator. The outputs of the multivibrator and the audio oscillator are coupled to a step recovery diode which produces a spectrum of a plurality of harmonics of the frequency of the multivibrator, each of which is phase modulated by the output of the audio oscillator.

4 Claims, 1 Drawing Figure

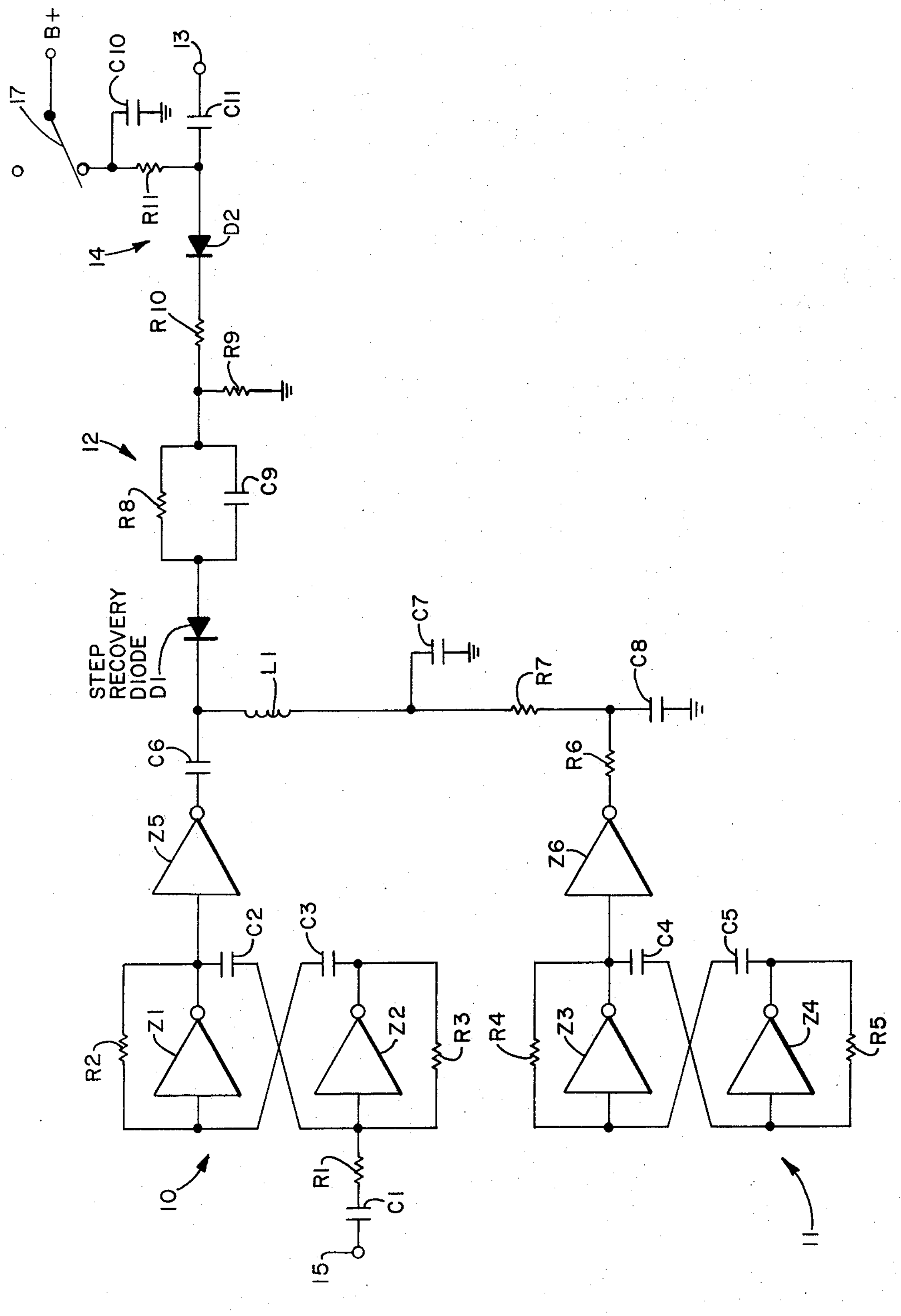
B+
17
C10
13
C11
R11
D2
14
R10
R9
12
R8
C9
STEP RECOVERY DIODE D1
L1
C7
R7
C8
C6
R6
Z5
Z6
C2
C3
C4
C5
R2
Z1
Z2
R3
R4
Z3
Z4
R5
10
R1
C1
15
11

MULTIPLE CARRIER PHASE MODULATED SIGNAL GENERATING APPARATUS

BACKGROUND OF THE INVENTION

This invention relates to apparatus for generating a spectrum of modulated frequencies. More particularly, it is concerned with apparatus for generating a plurality of audio modulated carrier frequencies for use in testing broadband FM receivers.

The operation of broadband FM communication receivers on all the channels of communication may be checked by test equipment which produces an audio modulated signal at each carrier frequency. The test signals are applied at the antenna connection of an FM receiver and the detection of the audio tone on a selected channel is an indication that the receiver is operating properly on that channel. For use under field conditions the test equipment should be small and self-contained. It is desirable that the test equipment be sufficiently small that it can be built into the FM receiver so as to permit immediate checking of receiver operation at any time at any place.

Test equipment for testing FM receivers has been developed utilizing broadband noise generators and amplitude modulation to obtain a broadband spectrum of audio modulated carrier frequencies. However, amplitude modulation requires that additional circuitry be incorporated in the FM receiver, does not check all the sections of a receiver, and produces considerable unwanted noise.

Test equipment in which the carrier frequencies are frequency modulated has also been developed. However, the modulation of signals produced by available apparatus of this type varies with carrier frequency.

SUMMARY OF THE INVENTION

Multiple carrier phase modulated signal generating apparatus in accordance with the present invention for testing broadband FM receivers provides phase modulated carrier frequencies which produce a substantially constant audio tone level for each carrier frequency when detected. The apparatus includes a first oscillator means which produces a signal of basic frequency at its output connection. The basic frequency may be equal to the spacing between adjacent channels, or carrier frequencies, of the FM receiver to be tested. A second oscillator means produces a signal of a modulation frequency (an audio frequency) at its output connection. The output connections of the first and second oscillator means are coupled to a spectrum generating-phase modulating means which generates a plurality of harmonics of the basic frequency each of which is phase modulated by the modulation frequency. Each of the plurality of output signals deviates from a harmonic of the basic frequency by an amount and at a rate which is the same for all harmonics.

BRIEF DESCRIPTION OF THE DRAWING

Additional objects, features, and advantages of signal generating apparatus in accordance with the present invention will be apparent from the following detailed discussion together with the accompanying drawing wherein the single FIGURE is a schematic circuit diagram of multiple carrier phase modulated signal generating apparatus in accordance with the invention for use in testing broadband FM receivers.

DETAILED DESCRIPTION OF THE INVENTION

Multiple carrier phase modulated signal generating apparatus for testing broadband FM receivers as illustrated in the schematic circuit diagram of the single FIGURE of the drawing includes a triggered free-running multivibrator 10. The multivibrator produces pulses at a basic frequency which is equal to the spacing between adjacent channels of the receiver to be tested. The apparatus also includes an audio frequency oscillator 11 which is also a free-running multivibrator. The outputs of the two multivibrators 10 and 11 are coupled through appropriate coupling and filtering arrangements to a step recovery diode D1 which serves as a spectrum generator and phase modulator as will be explained hereinbelow. The output signals of the step recovery diode D1 are applied to a shaping network 12 and are connected to an output terminal 13 by way of a diode switch 14.

A basic frequency multivibrator 10 as illustrated in the FIGURE utilizes a pair of inverter circuits Z1 and Z2 having their outputs and inputs cross-coupled by capacitances C2 and C3 and resistances R2 and R3. For example, the inverters may be standard transistor-transistor-logic type integrated circuit devices. The multivibrator 10 may be synchronized at a desired frequency slightly higher than the frequency of the free-running multivibrator as determined by the component values by a reference frequency signal applied at terminal 15 and coupled through capacitance C1 and resistance R1 to the input of inverter circuit Z2. The output of the multivibrator 10 which is essentially a series of square-wave pulses is taken through a buffer circuit Z5, another inverter circuit, connected to the output of the first inverter circuit Z1.

The audio oscillator 11 is also a multivibrator employing two similar inverter circuits Z3 and Z4 having their input and outputs cross-coupled by means of capacitances C4 and C5 and resistances R4 and R5. The output of the first inverter circuit Z3 is taken through a buffer circuit Z6, another inverter circuit.

The outputs from the buffers Z5 and Z6 are coupled to the cathode of the step recovery diode D1 which operates as a spectrum generator and a phase modulator. The output of the basic frequency multivibrator 10 is coupled through a capacitance C6 to the cathode of the step recovery diode D1. The output of the audio frequency multivibrator 11 is coupled through an arrangement of resistances R6 and R7, capacitances C7 and C8, and an inductance L1 to the cathode of the step recovery diode D1. The network between the audio oscillator 11 and the step recovery diode D1 serves as a filter to pass the fundamental audio frequency in the oscillator output and to attenuate higher frequency components in the square-wave output of the oscillator. This network also blocks the relatively high basic frequency of the multivibrator 10. Capacitance C6 couples the output of the basic frequency multivibrator 10 to the step recovery diode D1 and blocks the lower frequency audio signals of the audio oscillator 11.

The step recovery diode D1 is an impulse type spectrum generator which produces a spectrum of frequencies by generating pulses of energy having an extremely steep rise time at a repeating rate. Energy is concentrated at multiples of the repetition rate at which pulses are generated, and the maximum upper frequency obtainable and the uniformity of amplitude of the frequencies are determined by the steepness of the pulses. The pulses from the multivibrator 10 applied to the step recovery diode D1 at the basic frequency rate cause the step recovery diode to produce a spectrum of a plurality of harmonics of the basic frequency. The audio frequency signal from the audio oscillator 11 modulates the DC through the step recovery diode, thus creating a phase plus amplitude modulated signal at each of the plurality of harmonics. Therefore, the output signals from the step recovery diode D1 are a plurality of carrier frequencies each of which deviates by the same amount and at the same rate. The amount of deviation is determined by the amplitude of the audio signal and the modulator characteristics. The rate of deviation is equal to the frequency of the audio signal.

The shaping network 12 of capacitance C9 is parallel with resistance R8 attenuates the output signals from the step recovery diode D1 by an amount which is inversely related to the frequency. Thus, since the spectrum of frequencies from the diode vary with the higher frequencies of lesser amplitude, the shaping network 12 tends to equalize the amplitudes of the output signals by reducing their differences.

The signals from the shaping network 12 are conducted to the output terminal 13 by way of the diode switch 14. The diode switch includes the combination of resistances R9, R10, and R11, capacitance C10, and C11, and a diode D2. When the diode D2 is forward biased by the presence of a B+ potential applied thereto as by way of a switch 17, for example, signals from the pulse shaping network 12 will pass to the output terminal 13. When there is no B+ applied to forward bias the diode D2, the output terminal 13 is isolated from the signals.

Apparatus in accordance with the foregoing detailed description has been fabricated employing the particular components as listed below.

| | |
|---|---|
| Z1, Z2, Z3, Z4, Z5, Z6 | SN 5404 hex-inverter (integrated circuit) |
| D1 | 1N4949 step recovery diode |
| D2 | 2-1N4531 diodes in series |
| R1 | 5.1 K ohms |
| R2 | 2.0 K ohms |
| R3 | 2.0 K ohms |
| R4 | 1.5 K ohms |
| R5 | 1.5 K ohms |
| R6 | 1.0 K ohms |
| R7 | 270 ohms |
| R8 | 270 ohms |
| R9 | 2.7 K ohms |
| R10 | 10 ohms |
| R11 | 2.7 K ohms |
| C1 | 0.1 $\mu$ farad |
| C2 | 0.01 $\mu$ farad and 0.0072 $\mu$ farad in parallel |
| C3 | 0.01 $\mu$ farad and 0.0072 $\mu$ farad in parallel |
| C4 | 2–0.33 $\mu$ farad in parallel |
| C5 | 2–0.33 $\mu$ farad in parallel |
| C6 | 0.1 $\mu$ farad |
| C7 | 0.01 $\mu$ farad |
| C8 | 0.1 $\mu$ farad |
| C9 | 100 p farad |
| C10 | 0.1 $\mu$ farad |
| C11 | 0.01 $\mu$ farad |
| L1 | 10 $\mu$ henry |
| B+ | + 5 volts D.C. |

This apparatus was designed for testing FM receivers operating in the 30 to 80 megahertz range with separation between channels of 50 kilohertz. The basic frequency of the triggered free-running multivibrator 10 was synchronized at 50 kilohertz by a 50 kilohertz reference signal applied at the terminal 15. The frequency of the audio oscillator 11 was approximately 1,000 hertz. The amount of deviation of each carrier frequency was approximately 800 hertz.

Thus, apparatus as described provides substantially equal audio signals at all carrier frequencies within the range of interest. It provides a test source for broadband FM communication receivers which checks all sections of the receiver and produces a detected tone which is substantially the same on any channel undergoing tests. Furthermore, the circuit permits the use of standard integrated circuits together with a small number of additional components. The apparatus is small and self-contained and may be built into FM communication receivers without adding unduly to bulk or weight and without requiring additional circuitry in the receiver itself.

While there has been shown and described what is considered a preferred embodiment of the present invention, it will be obvious to those skilled in the art that various changes and modifications may be made therein without departing from the invention as defined by the appended claims.

What is claimed is:

1. Multiple carrier phase modulated signal generating apparatus including in combination first oscillator means operable to produce a signal of a basic frequency at an output connection;

second oscillator means operable to produce a signal of a modulation frequency at an output connection; and spectrum generating-phase modulating means including a step recovery diode having an input electrode coupled to the output connection of the first oscillator means through a capacitance operable to block the modulation frequency and coupled to the output connection of the second oscillator means through a filtering means operable to pass the modulation frequency and block the basic frequency and having an output electrode, said spectrum generating-phase modulating means being operable to generate a plurality of harmonics of the basic frequency and to phase modulate each of the harmonics of the basic frequency by the modulation frequency; whereby a plurality of output signals are produced at the output electrode of the step recovery diode, each output signal being a harmonic of the basic frequency phase modulated by the modulation frequency.

2. Multiple carrier phase modulated signal generating apparatus in accordance with claim 1 wherein said first oscillator means includes a triggered free-running multivibrator employing two cross-coupled inverter circuits; and said second oscillator means includes a free-running multivibrator employing two cross-coupled inverter circuits.

3. Multiple carrier phase modulated signal generating apparatus in accordance with claim 2 including signal shaping means connected to the output connection of the spectrum generating-phase modulating means and operable to attenuate the plurality of output signals from the spectrum generating-phase modulating means by an amount inversely related to the frequency of the output signals whereby differences in the amplitudes of the output signals are reduced.

4. Multiple carrier phase modulated signal generating apparatus in accordance with claim 3 including an output terminal; and diode switch means coupled between the output connection of the signal generating-phase modulating means and the output terminal and operable to permit output signals to be passed to the output terminal only when a forward biasing potential is applied to the diode switch means.

* * * * *